(12) United States Patent
Miyaki et al.

(10) Patent No.: US 8,455,385 B2
(45) Date of Patent: Jun. 4, 2013

(54) METHOD OF MANUFACTURING LITHIUM-ION SECONDARY BATTERY POSITIVE ELECTRODE, METHOD OF MANUFACTURING LITHIUM-ION SECONDARY BATTERY, LITHIUM-ION SECONDARY BATTERY POSITIVE ELECTRODE, AND LITHIUM-ION SECONDARY BATTERY

(71) Applicant: TDK Corporation, Tokyo (JP)

(72) Inventors: Yousuke Miyaki, Tokyo (JP); Kazuo Katai, Tokyo (JP); Masayoshi Hirano, Tokyo (JP); Kiyonori Hinoki, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 13/675,842

(22) Filed: Nov. 13, 2012

(65) Prior Publication Data

US 2013/0071743 A1    Mar. 21, 2013

Related U.S. Application Data

(62) Division of application No. 12/644,626, filed on Dec. 22, 2009, now abandoned.

(30) Foreign Application Priority Data

Dec. 26, 2008   (JP) ................................ 2008-333371

(51) Int. Cl.
    *H01M 4/13*      (2010.01)
    *H01M 4/88*      (2006.01)

(52) U.S. Cl.
    USPC .......................... 502/101; 429/217; 252/182.1

(58) Field of Classification Search
    USPC .......................... 502/101; 429/217; 252/182.1
    See application file for complete search history.

(56) References Cited

U.S. PATENT DOCUMENTS

| | | |
|---|---|---|
| 2002/0192549 A1 | 12/2002 | Maruyama et al. |
| 2008/0319149 A1 | 12/2008 | Fujimoto et al. |

FOREIGN PATENT DOCUMENTS

| | | |
|---|---|---|
| EP | 2 042 523 A1 | 4/2009 |
| JP | A-9-306502 | 11/1997 |
| JP | A-11-195419 | 7/1999 |
| JP | A-2000-21408 | 1/2000 |
| JP | A-2000-90917 | 3/2000 |
| JP | A-2003-31222 | 1/2003 |
| JP | A-2004-87325 | 3/2004 |
| JP | A-2004-342517 | 12/2004 |
| JP | A-2005-310747 | 11/2005 |
| JP | 20051116092 A1 | 12/2005 |
| JP | A-2007-273108 | 10/2007 |
| JP | A-2008-45096 | 2/2008 |
| JP | A-2008-066028 | 3/2008 |
| JP | A-2008-88330 | 4/2008 |
| JP | A-2008-218385 | 9/2008 |

OTHER PUBLICATIONS

Jun. 13, 2012 Office Action issued in U.S. Appl. No. 12/644,626.

*Primary Examiner* — Helen O Conley (74) *Attorney, Agent, or Firm* — Oliff & Berridge, PLC (57) ABSTRACT

A method of manufacturing a lithium-ion secondary battery positive electrode comprises a coating material preparing step of preparing a positive electrode active material layer forming coating material by mixing a positive electrode active material, a binder, a conductive auxiliary, an organic solvent, and water; and an active material layer forming step of forming a positive electrode active material layer on a current collector by using the positive electrode active material layer forming coating material. The binder is polyvinylidene fluoride produced by emulsion polymerization. The positive electrode active material layer forming coating material is prepared in the coating material preparing step such that the amount of water added (% by mass) based on the total amount of the organic solvent and water and the pH of the positive electrode active material satisfy the following expression (1):

$$48 \leq [\text{the amount of water added} + (4.25 \times \text{the pH of the positive electrode active material})] \leq 52 \quad (1).$$

5 Claims, 10 Drawing Sheets

METHOD OF MANUFACTURING LITHIUM-ION SECONDARY BATTERY POSITIVE ELECTRODE, METHOD OF MANUFACTURING LITHIUM-ION SECONDARY BATTERY, LITHIUM-ION SECONDARY BATTERY POSITIVE ELECTRODE, AND LITHIUM-ION SECONDARY BATTERY

This is a Division of application Ser. No. 12/644,626 filed Dec. 22, 2009. The entire disclosure of the prior application is hereby incorporated by reference herein in its entirety.

BACKGROUND OF THE INVENTION

1. Field of the Invention

The present invention relates to a method of manufacturing a lithium-ion secondary battery positive electrode, a method of manufacturing a lithium-ion secondary battery, a lithium-ion secondary battery positive electrode, and a lithium-ion secondary battery.

2. Related Background Art

It is desirable for lithium-ion secondary batteries to secure homogeneity within an electrode in order to improve the electrode capacity, cycle characteristics, and reliability. The homogeneity within an electrode seems to be secured when a coating material for forming the electrode has favorable dispersibility. When the productivity of electrodes is taken into consideration, it will be desirable if the dispersibility of the coating material is not deteriorated with time by aggregations of components contained therein and the like.

Since the deterioration in dispersibility of a coating material with time begins immediately after making the coating material, a method of keeping a network structure in the coating material by increasing the amount of binders contained in the coating material has been under consideration as a measure for suppressing the deterioration with time (see, for example, Japanese Patent Application Laid-Open No. 2000-021408). This increases the amount of binders which do not contribute to electric characteristics, whereby problems in cell characteristics such as decreases in capacity and increases in resistance value may occur. From the viewpoint of keeping a network structure, increasing the amount of conductive carbon may be considered. This is effective in lowering the resistance value, but may decrease the amount of active materials contained, thus reducing the capacity and making the coating film structure fragile, thereby failing to improve the reliability.

As the binders added to the coating material, those made by suspension polymerization have been in wide use (see, for example, Japanese Patent Application Laid-Open Nos. 2004-087325, 2005-310747, 2008-045096, and 2008-088330 and Japanese Domestic Republication of PCT International Application Laid-Open No. 2005-116092).

SUMMARY OF THE INVENTION

As in the foregoing, it has conventionally been difficult to inhibit the dispersibility of produced coating materials from deteriorating with time without worsening characteristics of lithium-ion secondary batteries.

In view of the problems of the prior art mentioned above, it is an object of the present invention to provide a method of manufacturing a lithium-ion secondary battery positive electrode which can manufacture a positive electrode capable of improving the cycle characteristic of the lithium-ion secondary battery, while being excellent in productivity and able to inhibit the dispersibility of a coating material for forming the positive electrode from deteriorating with time. It is another object of the present invention to provide a method of manufacturing a lithium-ion secondary battery which can manufacture a lithium-ion secondary battery having an improved cycle characteristic, while being excellent in productivity and able to inhibit the dispersibility of a coating material for forming the positive electrode from deteriorating with time. It is a further object of the present invention to provide a lithium-ion secondary battery positive electrode which can improve the cycle characteristic of a lithium-ion secondary battery and a lithium-ion secondary battery using the same.

The inventors conducted diligent studies in order to achieve the above-mentioned objects and, as a result, have found that the easiness for the coating material to aggregate also depends on the type of polymerization of binders in use, so that binders made by suspension polymerization cause alkali components of active materials in use to generate a hydrogen fluoride elimination reaction with time, thereby polymerizing the binders together and gelling them. The inventors have therefore found it important to choose binders for use and manage the pH of active materials for use. The inventors have further found that the deterioration of dispersibility in a coating material with time can be suppressed more by adding a predetermined amount of water to the coating material rather than by eliminating moisture from within the coating material so as to keep it from becoming alkaline, and the cycle characteristic of the lithium-ion secondary battery can also be improved thereby.

Hence, the present invention provides a method of manufacturing a lithium-ion secondary battery positive electrode, the method comprising a coating material preparing step of preparing a positive electrode active material layer forming coating material by mixing at least a positive electrode active material, a binder, a conductive auxiliary, an organic solvent, and water; and an active material layer forming step of forming a positive electrode active material layer on a current collector by using the positive electrode active material layer forming coating material; wherein the binder is polyvinylidene fluoride produced by emulsion polymerization; and wherein the positive electrode active material layer forming coating material is prepared in the coating material preparing step such that the amount of water added (% by mass) based on the total amount of the organic solvent and water and the pH of the positive electrode active material satisfy the following expression (1):

$$48 \leq [\text{the amount of water added} + (4.25 \times \text{the pH of the positive electrode active material})] \leq 52 \quad (1)$$

By using polyvinylidene fluoride (PVDF) produced by emulsion polymerization as a binder and adjusting the amount of water added in the coating material and the pH of the positive electrode active material such as to satisfy the above-mentioned expression (1), the method of manufacturing a lithium-ion secondary battery positive electrode in accordance with the present invention can yield a positive electrode capable of improving the cycle characteristic of the lithium-ion secondary battery, while being excellent in productivity and able to inhibit the dispersibility of the coating material for forming the positive electrode from deteriorating with time.

Though the reason why the effect mentioned above is exhibited by adding a predetermined amount of water to the coating material is not definitely clear, the inventors presume as follows. It is inferred that, while a network of the binder dispersed in the coating material supports the positive electrode active material and keeps this structure when there is no water added thereto, PVDF and the conductive auxiliary increase their affinity to each other with time, so as to dissolve the network of PVDF, thus aggregating the coating material, whereby the viscosity changes when aggregates are separated.

When water is added to the coating material such as to satisfy the above-mentioned expression (1), on the other hand, it is speculated that water molecules in the coating material are hydrogen-bonded to the main chain of PVDF, thus making it possible to support the positive electrode active material without breaking the network structure formed by the binder, whereby no aggregation occurs with time. This hydrogen bond has such a weak binding strength as to be broken by a force as small as that of stirring the coating material. Therefore, the coating material keeps its fluidity when in use. When the fluidity is lost, however, hydrogen bonds occur again, thereby making it possible to keep the structure in the coating material and inhibit the viscosity from changing. Since the coating material is restrained from aggregating, the conductive auxiliary exists in the binder while being fully dispersed therein when the positive electrode active material layer is formed, whereby the cycle characteristic of the lithium-ion secondary battery can be improved.

When such a large amount of water is added to the coating material as to dissatisfy the above-mentioned expression (1), the alkali components in the positive electrode active material makes the coating material alkaline, so that the main chain of PVDF seems to generate a hydrogen fluoride elimination reaction, thereby producing a double bond. This double bond is so unstable as to generate a chemical bond with its adjacent double bond, thereby gelling the coating material.

Preferably, the amount of water added in the coating material preparing step in the method of manufacturing a lithium-ion secondary battery positive electrode in accordance with the present invention is 4 to 10% by mass based on the total amount of the organic solvent and water. The amount of water added falling within the range mentioned above can more fully inhibit the dispersibility of the positive electrode active material layer forming coating material from deteriorating with time and further improve the cycle characteristic of the lithium-ion secondary battery.

Preferably, in the method of manufacturing a lithium-ion secondary battery positive electrode in accordance with the present invention, the organic solvent is N-methyl-2-pyrrolidone. Using N-methyl-2-pyrrolidone as the organic solvent can further improve the cycle characteristic of the lithium-ion secondary battery.

In another aspect, the present invention provides a method of manufacturing a lithium-ion secondary battery having a step of making a positive electrode by the above-mentioned method of manufacturing a lithium-ion secondary battery positive electrode.

This method of manufacturing a lithium-ion secondary battery has a step of making a positive electrode by the above-mentioned method of manufacturing a lithium-ion secondary battery positive electrode in accordance with the present invention and thus can manufacture a lithium-ion secondary battery having an improved cycle characteristic, while being excellent in productivity and able to inhibit the dispersibility of the coating material for forming the positive electrode from deteriorating with time.

In still another aspect, the present invention provides a lithium-ion secondary battery positive electrode comprising a current collector and a positive electrode active material layer formed on the current collector; wherein the positive electrode active material layer contains a positive electrode active material, a binder, and a conductive auxiliary; wherein the binder is polyvinylidene fluoride produced by emulsion polymerization; and wherein at least a part of a surface of the positive electrode active material in the positive electrode active material layer is covered with a coating layer formed by dispersing the conductive auxiliary into the binder.

This lithium-ion secondary battery positive electrode has the structure mentioned above and thus can improve the cycle characteristic of the lithium-ion secondary battery.

Preferably, in the lithium-ion secondary battery positive electrode of the present invention, a plurality of pieces of the positive electrode active material are connected to each other through the coating layer in the positive electrode active material layer. When the positive electrode active material layer has the structure mentioned above, the cycle characteristic of the lithium-ion secondary battery can further be improved.

In still another aspect, the present invention provides a lithium-ion secondary battery positive electrode made by the method of manufacturing a lithium-ion secondary battery positive electrode in accordance with the present invention.

Since this lithium-ion secondary battery positive electrode is made by the method of manufacturing a lithium-ion secondary battery positive electrode in accordance with the present invention, the conductive auxiliary exists in the positive electrode active material layer while being fully dispersed in the binder without aggregating, whereby the cycle characteristic of the lithium-ion secondary battery can be improved.

In a further aspect, the present invention provides a lithium-ion secondary battery comprising the lithium-ion secondary battery positive electrode of the present invention.

This lithium-ion secondary battery comprises the lithium-ion secondary battery positive electrode of the present invention and thus can yield an excellent cycle characteristic.

As in the foregoing, the present invention can provide a method of manufacturing a lithium-ion secondary battery positive electrode which can manufacture a positive electrode capable of improving the cycle characteristic of a lithium-ion secondary battery, while being excellent in productivity and able to inhibit the dispersibility of a coating material for forming the positive electrode from deteriorating with time. The present invention can also provide a method of manufacturing a lithium-ion secondary battery which can manufacture a lithium-ion secondary battery having an improved cycle characteristic, while being excellent in productivity and able to inhibit the dispersibility of a coating material for forming the positive electrode from deteriorating with time. The present invention can further provide a lithium-ion secondary battery positive electrode which can improve the cycle characteristic of a lithium-ion secondary battery and a lithium-ion secondary battery using the same.

DESCRIPTION OF THE PREFERRED EMBODIMENTS

In the following, preferred embodiments of the present invention will be explained in detail with reference to the drawings as the case may be. In the drawings, the same or equivalent parts will be referred to with the same signs, while omitting their overlapping explanations. Positional relationships such as upper, lower, left, and right are based on those illustrated in the drawings, unless otherwise specified. Ratios of dimensions in the drawings are not limited to those depicted.

Figure 1:
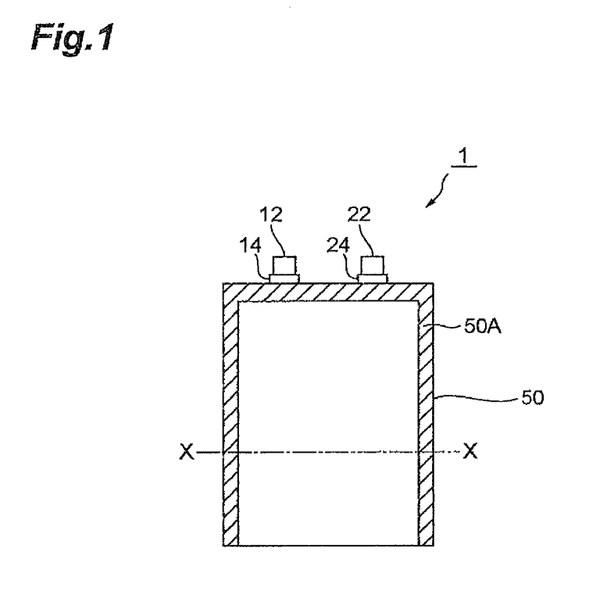
FIG. 1 is a front view illustrating a preferred embodiment of the lithium-ion secondary battery in accordance with the present invention.

Lithium-Ion Secondary Battery Positive Electrode and Lithium-Ion Secondary Battery FIG. 1 is a front view illustrating a preferred embodiment of the lithium-ion secondary battery in accordance with the present invention.

Figure 2:
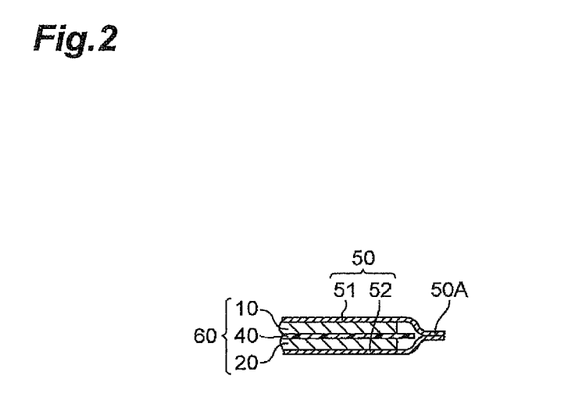
FIG. 2 is a schematic sectional view of the lithium-ion secondary battery taken along the line X-X of FIG. 1.

FIG. 2 is a schematic sectional view of the lithium-ion secondary battery 1 of FIG. 1 taken along the line X-X.

As illustrated in FIGS. 1 and 2, the lithium-ion secondary battery 1 is mainly constituted by a power generating element 60 comprising a planar negative electrode 10 and a planar positive electrode 20 which oppose each other and a planar separator 40 arranged between and adjacent to the negative electrode 10 and positive electrode 20, an electrolytic solution (nonaqueous electrolytic solution in this embodiment) containing lithium ions, a case 50 accommodating them in a closed state, a negative electrode lead 12 having one end part electrically connected to the negative electrode 10 and the other end part projecting out of the case 50, and a positive electrode lead 22 having one end part electrically connected to the positive electrode 20 and the other end part projecting out of the case 50.

In this specification, the "negative electrode", which is based on the polarity of the battery at the time of discharging, refers to an electrode which releases electrons by an oxidation reaction at the time of discharging. The "positive electrode", which is based on the polarity of the battery at the time of discharging, refers to an electrode which receives electrons by a reduction reaction at the time of discharging.

Figure 3:
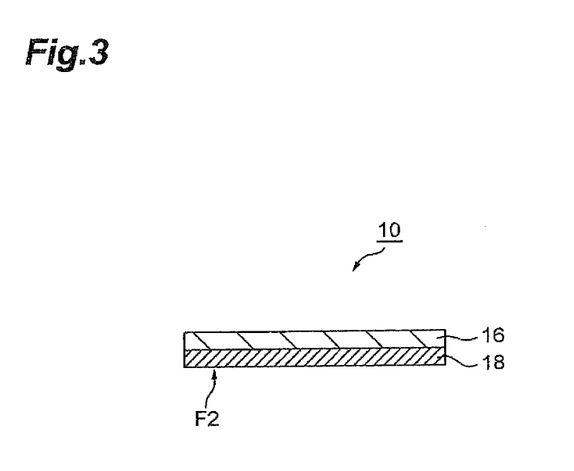
FIG. 3 is a schematic sectional view illustrating an example of basic structures of a negative electrode in the lithium-ion secondary battery.
Figure 4:
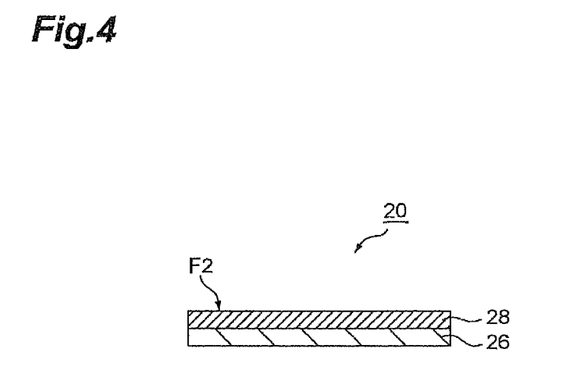
FIG. 4 is a schematic sectional view illustrating an example of basic structures of a positive electrode in the lithium-ion secondary battery.

FIG. 3 is a schematic sectional view illustrating an example of basic structures of the negative electrode 10 in the lithium-ion secondary battery 1. FIG. 4 is a schematic sectional view illustrating an example of basic structures of the positive electrode 20 in the lithium-ion secondary battery 1.

As illustrated in FIG. 3, the negative electrode 10 is constituted by a current collector 16 and a negative electrode active material layer 18 formed on the current collector 16. As illustrated in FIG. 4, the positive electrode 20 is constituted by a current collector 26 and a positive electrode active material layer 28 formed on the current collector 26.

The current collectors 16, 26 are not limited in particular as long as they are good conductors which can sufficiently transfer electric charges to the negative and positive electrode active material layers 18, 28, respectively; known current collectors employed in lithium-ion secondary batteries can be used. Examples of the current collectors 16, 26 include metal foils made of copper and aluminum, respectively.

The negative electrode active material layer 18 of the negative electrode 10 is mainly constituted by a negative electrode active material and a binder. Preferably, the negative electrode active material layer 18 further contains a conductive auxiliary.

The negative electrode active material is not limited in particular as long as it allows occlusion and release of lithium ions, desorption and insertion (intercalation) of lithium ions, or doping and undoping of lithium ions to proceed reversibly; known negative electrode active materials can be used. Examples of the negative electrode active material include carbon materials such as natural graphite, synthetic graphite, non-graphitizing carbon, graphitizable carbon, and low-temperature-firable carbon; metals such as Al, Si, and Sn which are combinable with lithium; amorphous compounds mainly composed of oxides such as SiO, $SiO_2$, $SiO_x$, and $SnO_2$; lithium titanate ($Li_4Ti_5O_{12}$); and $TiO_2$.

As the binder used in the negative electrode 10, known binders can be employed without any restrictions in particular. Examples include fluororesins such as polyvinylidene fluoride (PVDF), polytetrafluoroethylene (PTFE), tetrafluoroethylene/hexafluoropropylene copolymers (FEP), tetrafluoroethylene/perfluoroalkylvinyl ether copolymers (PFA), ethylene/tetrafluoroethylene copolymers (ETFE), polychlorotrifluoroethylene (PCTFE), ethylene/chlorotrifluoroethylene copolymers (ECTFE), and polyvinyl fluoride (PVF). For more fully binding constituent materials such as active material particles, the conductive auxiliary added when necessary, and the like together and more fully binding these constituent materials to the current collector, functional groups such as carboxylic acids may be introduced in the binder.

Other examples of the binder include fluorine rubbers based on vinylidene fluoride such as fluorine rubbers based on vinylidene fluoride/hexafluoropropylene (VDF/HFP-based fluorine rubbers).

Still other examples of the binder include polyethylene, polypropylene, polyethylene terephthalate, aromatic polyamides, cellulose, styrene/butadiene rubber, isoprene rubber, butadiene rubber, and ethylene/propylene rubber. Also employable are thermoplastic elastomeric polymers such as styrene/butadiene/styrene block copolymers and hydrogenated derivatives thereof, styrene/ethylene/butadiene/styrene copolymers, and styrene/isoprene/styrene block copolymers and hydrogenated derivatives thereof. Further employable are syndiotactic 1,2-polybutadiene, ethylene/vinyl acetate copolymers, propylene-α-olefin (having a carbon number of 2 to 12) copolymers, and the like. Conductive polymers may also be used.

As the conductive auxiliary used when necessary, known conductive auxiliaries can be employed without any restrictions in particular. Examples include carbon blacks, carbon materials, powders of metals such as copper, nickel, stainless steel, and iron, mixtures of the carbon materials and metal powders, and conductive oxides such as ITO.

The content of the negative electrode active material in the negative electrode active material layer 18 is preferably 80 to 98% by mass, more preferably 85 to 97% by mass, based on the total amount of the negative electrode active material layer 18. When the content of the negative electrode active material is less than 80% by mass, the energy density tends to become lower than that in the case where the content falls within the range mentioned above. When the content of the negative electrode active material exceeds 98% by mass, the bonding force tends to become weaker, thereby lowering the cycle characteristic as compared with the case where the content falls within the range mentioned above.

The positive electrode active material layer 28 of the positive electrode 20 is mainly constituted by a positive electrode active material, a binder, and a conductive auxiliary.

Figure 5:
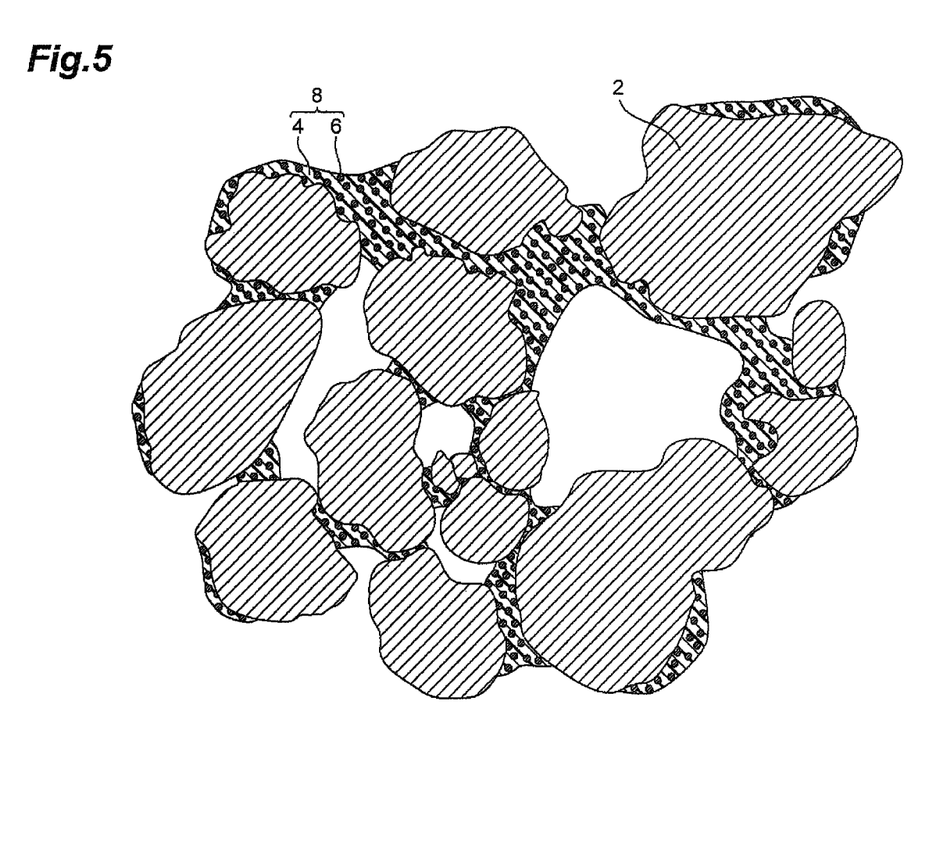
FIG. 5 is a schematic sectional view illustrating an inner structure of a positive electrode active material layer.

FIG. 5 is a schematic sectional view illustrating an inner structure of the positive electrode active material layer 28. As illustrated in FIG. 5, at least a part of a surface of the positive electrode active material 2 in the positive electrode active material layer 28 is covered with a coating layer 8 formed by dispersing a conductive auxiliary 6 in a binder 4. Preferably, as illustrated in FIG. 5, the positive electrode active material layer 28 has a structure in which a plurality of pieces of the positive electrode active material 2 are connected together through the coating layer 8.

The positive electrode active material 2 is not limited in particular as long as it allows occlusion and release of lithium ions, desorption and insertion (intercalation) of lithium ions, or doping and undoping of lithium ions to proceed reversibly; known positive electrode active materials can be used. Examples of the positive electrode active material include lithium cobaltate ($LiCoO_2$), lithium nickelate ($LiNiO_2$), lithium manganese spinel ($LiMn_2O_4$), mixed metal oxides expressed by the general formula of $LiNi_xCo_yMn_zM_aO_2$ (where $x+y+z+a=1$, $0 \leq x \leq 1$, $0 \leq y \leq 1$, $0 \leq z \leq 1$, $0 \leq a \leq 1$, and M is at least one kind of element selected from Al, Mg, Nb, Ti, Cu, Zn, and Cr), a lithium vanadium compound ($LiV_2O_5$), olivine-type $LiMPO_4$ (where M is at least one kind of element selected from Co, Ni, Mn, Fe, Mg, Nb, Ti, Al, and Zr, or VO), and mixed metal oxides such as lithium titanate ($Li_4Ti_5O_{12}$).

As the binder 4, polyvinylidene fluoride produced by emulsion polymerization is used. Binders other than polyvinylidene fluoride produced by emulsion polymerization may be used therewith as long as they fall within a range not inhibiting effects of the present invention. As the other binders, those similar to the binder used in the negative electrode 10 can be employed.

Known conductive auxiliaries can be used as the conductive auxiliary 6 without being restricted in particular. Examples of the conductive auxiliary 6 include carbon blacks, carbon materials, powders of metals such as copper, nickel, stainless steel, and iron, mixtures of the carbon materials and metal powders, and conductive oxides such as ITO.

From the viewpoint of imparting a favorable cycle characteristic to the lithium-ion secondary battery, the average particle size of the conductive auxiliary 6 is preferably 30 to 100 nm, more preferably 35 to 60 nm.

The ratio of area occupied by the coating layer 8 in a cross section of the positive electrode active material layer 28 is preferably 10 to 60%, more preferably 30 to 50%. The ratio of area occupied by the coating layer 8 is measured by electron microscopic observation or the like. When the ratio of area is less than 10%, the area in contact with the active material becomes less sufficient than in the case where the ratio falls within the range mentioned above, whereby conductivity tends to be distributed unevenly. When the ratio of area exceeds 60%, the surface area contributing to desorption and insertion of lithium ions tends to become smaller than that in the case where the ratio falls within the above-mentioned range, thereby lowering the capacity.

The content of the positive electrode active material 2 in the positive electrode active material layer 28 is preferably 80 to 97% by mass, more preferably 85 to 96% by mass, based on the total amount of the positive electrode active material layer 28. When the content of the positive electrode active material 2 is less than 80% by mass, the energy density tends to become lower than that in the case where the content falls within the range mentioned above. When the content of the positive electrode active material 2 exceeds 97% by mass, the bonding force tends to become weaker, thereby lowering the cycle characteristic as compared with the case where the content falls within the above-mentioned range.

The content of the binder 4 in the positive electrode active material layer 28 is preferably 2 to 10% by mass, more preferably 2 to 5% by mass, based on the total amount of the positive electrode active material layer 28. When the content of the binder 4 is less than 2% by mass, the coating film strength and the adhesion to the current collector tend to become less sufficient, thereby lowering the cycle characteristic as compared with the case where the content falls within the range mentioned above. When the content of the binder 4 exceeds 10% by mass, the internal resistance tends to increase, thereby deteriorating characteristics as compared with the case where the content falls within the above-mentioned range.

The content of the conductive auxiliary 6 in the positive electrode active material layer 28 is preferably 1 to 10% by mass, more preferably 1.5 to 5% by mass, based on the total amount of the positive electrode active material layer 28. When the content of the conductive auxiliary 6 is less than 1% by mass, the conductivity tends to be provided less sufficiently, thereby causing characteristics to deteriorate as compared with the case where the content falls within the range mentioned above. When the content of the conductive auxiliary 6 exceeds 10% by mass, the coating film strength tends to become less sufficient, thereby lowering the cycle characteristic as compared with the case where the content falls within the above-mentioned range.

The current collector 26 of the positive electrode 20 is electrically connected to one end of the positive electrode lead 22 made of aluminum, for example, while the other end of the positive electrode lead 22 extends to the outside of the case 50. On the other hand, the current collector 16 of the negative electrode 10 is electrically connected to one end of the negative electrode lead 12 made of copper or nickel, for example, while the other end of the negative electrode lead 12 extends to the outside of the case 50.

The part of the negative electrode lead 12 in contact with a seal part 50A is covered with an insulator 14 for preventing the negative electrode lead 12 from coming into contact with a metal layer of the case 50. The part of the positive electrode lead 22 in contact with the seal part 50A is covered with an insulator 24 for preventing the positive electrode lead 22 from coming into contact with the metal layer of the case 50. The insulators 14, 24 also serve to improve the adhesion between the innermost layer of the case 50 and the leads 12, 22.

The separator 40 arranged between the negative electrode 10 and positive electrode 20 is not limited in particular as long as it is formed by a porous body having ion permeability and electronic insulativity, whereby separators used in known lithium-ion secondary batteries can be employed. Examples include multilayer bodies of films constituted by any of polyethylene, polypropylene, and polyolefin, extended films of mixtures of these polymers, and fibrous nonwovens constituted by at least one kind of constituent material selected from the group consisting of cellulose, polyester, and polypropylene.

The electrolytic solution (not depicted) fills the inner space of the case 50, while being partly contained within the negative electrode 10, positive electrode 20, and separator 40. As the electrolytic solution, a nonaqueous electrolytic solution in which a lithium salt is dissolved in an organic solvent is used. Examples of the lithium salt include $LiPF_6$, $LiClO_4$, $LiBF_4$, $LiAsF_6$, $LiCF_3SO_3$, $LiCF_3CF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$, and $LiN(CF_3CF_2CO)_2$. These salts may be used either singly or in combinations of two or more. The electrolytic solution may be gelled by addition of polymers and the like thereto.

As the organic solvent, one used in known lithium-ion secondary batteries can be employed. Preferred examples include propylene carbonate, ethylene carbonate, and diethyl carbonate. They may be used either singly or in mixtures of two or more at any ratios.

As illustrated in FIG. 2, the case 50 is formed by a pair of opposing films (first and second films 51, 52). Edge parts of films opposing and overlapping each other are sealed with an adhesive or by heat-sealing, so as to form the seal part 50A.

The film constituting the first and second films 51, 52 is a flexible film. Though this film is not limited in particular as long as it is a flexible film, it preferably has at least an innermost layer made of a polymer in contact with the power generating element 60 and a metal layer arranged on the side of the innermost layer opposite from the side in contact with the power generating element from the viewpoint of effectively preventing moisture and air from entering the inside of the case 50 from the outside and electrolyte components from dissipating from the inside to the outside of the case 50, while securing sufficient mechanical strength and lightweight of the case.

Method of Manufacturing Lithium-Ion Secondary Battery Positive Electrode and Method of Manufacturing Lithium-Ion Secondary Battery Methods of manufacturing the above-mentioned lithium-ion secondary battery positive electrode 20 and lithium-ion secondary battery 1 will now be explained.

The positive electrode 20 is made through at least a coating material preparing strep of preparing a positive electrode active material layer forming coating material (slurry, paste, or the like) by mixing at least the positive electrode active material 2, binder 4, conductive auxiliary 6, organic solvent, and water and an active material layer forming step of forming the positive electrode active material layer 28 on the current collector 26 by using the positive electrode active material layer forming coating material. In the coating material preparing step, the positive electrode active material layer forming coating material is prepared such that the amount of water added (% by mass) based on the total amount of the organic solvent and water and the pH of the positive electrode active material 2 satisfy the following expression (1):

$$48 \leq [\text{the amount of water added} + (4.25 \times \text{the pH of the positive electrode active material})] \leq 52 \quad (1)$$

Here, the pH of the positive electrode active material 2 is determined by mixing the positive electrode active material 2 and ion-exchanged water at a mass ratio of 1:100 and measuring the pH of the resulting mixed liquid with a pH meter.

As the positive electrode active material 2, binder 4, and conductive auxiliary 6 in the coating material preparing step, those mentioned in the explanation of the lithium-ion secondary battery positive electrode 20 can be used.

Here, the pH of the positive electrode active material 2 is preferably 9.0 to 11.5, more preferably 10.0 to 11.0. Using the positive electrode active material whose pH falls within the range mentioned above can more fully inhibit the dispersibility of the positive electrode active material layer forming coating material from deteriorating with time and further improve the cycle characteristic of the lithium-ion secondary battery.

The organic solvent used in the coating material preparing step is not limited in particular as long as the binder 4 is soluble therein; examples include N-methyl-2-pyrrolidone and N,N-dimethylformamide. In these organic solvents, N-methyl-2-pyrrolidone is preferred since it can improve the cycle characteristic of the lithium-ion secondary battery more.

Though not restricted in particular, purified water such as ion-exchanged water or distilled water is preferred as water used in the coating material preparing step.

The amount of water added in the coating material preparing step is preferably 4 to 10% by mass, more preferably 4 to 8% by mass, based on the total amount of the organic solvent and water. When the amount of water added is outside of the range mentioned above, the effect of inhibiting the dispersibility of the positive electrode active material layer forming coating material from deteriorating with time and the effect of improving the cycle characteristic of the lithium-ion secondary battery tend to decrease as compared with the case where the amount falls within the range mentioned above.

From the viewpoints of yielding favorable coating film formability and more fully inhibiting the coating material from deteriorating with time, the solid content of the positive electrode active material layer forming coating material in the coating material preparing step is preferably 60 to 72% by mass, more preferably 62 to 70% by mass, based on the total amount of the coating material.

In the active material layer forming step, the positive electrode active material layer forming coating material is applied onto the surface of the current collector 26, dried, and extended and so forth as necessary, so as to form the positive electrode active material layer 28 on the current collector 26, thereby yielding the positive electrode 20. The technique for applying the positive electrode active material layer forming coating material to the surface of the current collector 26 is not limited in particular, but may be determined as appropriate according to the material, form, and the like of the current collector 26. Examples of the coating method include metal mask printing, electrostatic coating, dip coating, spray coating, roll coating, doctor blading, gravure coating, and screen printing.

Making the positive electrode 20 through the above-mentioned coating material preparing step and active material layer forming step can form the positive electrode active material layer 28 having a structure in which at least a part of a surface of the positive electrode active material 2 is covered with the coating layer 8 formed by sufficiently dispersing the conductive auxiliary 6 in the binder 4 without aggregation as illustrated in FIG. 5.

The method of making the negative electrode 10 is not restricted in particular. For example, constituents of the negative electrode 10 mentioned above are mixed and dispersed in a solvent which can dissolve the binder, so as to make a negative electrode active material layer forming coating material (slurry, paste, or the like). The solvent is not limited in particular as long as the binder is soluble therein. Its examples include N-methyl-2-pyrrolidone and N,N-dimethylformamide.

Subsequently, the negative electrode active material layer forming coating material is applied onto a surface of the current collector 16, dried, and extended and so forth as necessary, so as to form the negative electrode active material layer 18 on the current collector 16, thereby yielding the negative electrode 10. An example of the technique for applying the negative electrode active material layer forming coating material onto the surface of the current collector 16 is one similar to the method of applying the positive electrode active material layer forming coating material mentioned above.

After making the negative electrode 10 and positive electrode 20 as mentioned above, the negative and positive leads 12, 22 are electrically connected to the negative and positive electrodes 10, 20, respectively.

Subsequently, the separator 40 is arranged between and in contact with the negative electrode 10 and positive electrode 20 (preferably in an unbonded state), so as to complete the power generating element 60 (multilayer body in which the negative electrode 10, separator 40, and positive electrode 20 are laminated in sequence in this order). Here, a surface F2 of the negative electrode 10 facing the negative electrode active material layer 18 and a surface F2 of the positive electrode 20 facing the positive electrode active material layer 28 are arranged in contact with the separator 40.

Next, the edge parts of the first and second films 51, 52 overlaid on each other are sealed with an adhesive or by heat sealing, so as to make the case 50. Here, for securing an opening for introducing the power generating element 60 into the case 50 in a later step, a part of the edge parts is left unsealed. This yields the case 50 having the opening.

Subsequently, the power generating element 60 having the negative and positive electrode leads 12, 22 electrically connected thereto is inserted into the case 50 having the opening, and the electrolytic solution is injected therein. Then, while the negative and positive electrodes 12, 22 are partly inserted in the case 50, the opening of the case 50 is sealed, whereby the lithium-ion secondary battery 1 is completed.

Though a preferred embodiment of the present invention is explained in the foregoing, the present invention is not limited thereto.

For example, though the above-mentioned embodiment explains the lithium-ion secondary battery 1 comprising one each of the negative and positive electrodes 10, 20, two or more each of the negative and positive electrodes 10, 20 may be provided while always arranging one separator 40 between each pair of the negative and positive electrodes 10, 20. The lithium-ion secondary battery 1 is not limited to the form illustrated in FIG. 1, but may have a cylindrical form, for example.

The lithium-ion secondary battery of the present invention can also be used for power supplies for self-propelled micrornachines, IC cards, and the like and decentralized power supplies placed on or within printed boards.

EXAMPLES

The present invention will now be explained more specifically with reference to examples and comparative examples. However, the present invention is not limited to the following examples. In the following examples and comparative examples, the pH of each positive electrode active material was determined by mixing the positive electrode active material and ion-exchanged water at a mass ratio of 1:100 and measuring the pH of the resulting mixed liquid with a pH meter.

Example 1

Preparation of a Positive Electrode Active Material Layer Forming Coating Material A slurry-like positive electrode active material layer forming coating material was prepared by adding 64.0 parts by mass of $LiCoO_2$ (product name: SE-02, manufactured by Seimi Chemical Co., Ltd., having a pH of 10.0) as a positive electrode active material, 1.5 parts by mass of polyvinylidene fluoride (PVDF) (product name: Solef 6020 manufactured by Solvay S.A.) produced by emulsion polymerization as a binder, and 1.5 parts by mass of carbon (product name: Super-P manufactured by TIMCAL) as a conductive auxiliary to 33.0 parts by mass of a mixed solvent in which N-methyl-2-pyrrolidone (NMP) and ion-exchanged water were mixed such that the amount of ion-exchanged water added was 8.5% by mass based on their total amount, and mixing them. In thus obtained coating material, the value of [the amount of water added+(4.25× the pH of the positive electrode active material)] was 51, which satisfied the above-mentioned expression (1).

Evaluation of the Coating Material State and Viscosity Change

The coating material state of thus produced positive electrode active material layer forming coating material (whether or not it was aggregated or gelled) immediately after its production was observed. As a result, the produced coating material was neither aggregated nor gelled, and thus was favorable.

Using a B-type viscometer, the viscosity of the produced positive electrode active material layer forming coating material was measured at an initial stage (immediately after the production), after being left for 24 hr at 25° C., and after being left for 48 hr at 25° C. Since the viscosity decreases when the dispersibility of the coating material deteriorates with time, the dispersibility of the coating material is more inhibited from deteriorating with time as the viscosity decreases less. Table 2 lists the results.

Making of a Positive Electrode

The produced positive electrode active material layer forming coating material was applied by doctor blading onto an Al foil serving as a current collector and dried, so as to yield a positive electrode in which a positive electrode active material layer having a thickness of 100 μm was formed on the current collector having a thickness of 15 μm.

Making of a Negative Electrode

A slurry-like negative electrode active material layer forming coating material was prepared by adding 46.0 parts by mass of graphite (product name: FNSC-1 manufactured by Shenglin, China) as a negative electrode active material, 1.2 parts by mass of styrene/butadiene copolymer (SBR) (product name: $SN_3O_7N$ manufactured by Nippon A&L Inc.) as a binder, 0.7 part by mass of carboxymethylcellulose (CMC) (product name: WS-C manufactured by Dai-Ichi Kogyo Seiyaku Co., Ltd.) as a thickener, and 0.7 part by mass of carbon (product name: Super-P manufactured by TIMCAL) as a conductive auxiliary to 51.4 parts by mass of ion-exchanged water and mixing them. This coating material was applied by doctor blading to a copper foil serving as a current collector and dried, so as to yield a negative electrode in which a negative electrode active material layer having a thickness of 100 μm was formed on the current collector having a thickness of 15 μm.

Making of a Lithium-Ion Secondary Battery

The negative electrode was punched out into a size of 17.5 mm×34.5 mm, the positive electrode was punched out into a size of 17 mm×34 mm, and a separator made of polyethylene was arranged between and laminated with the negative and positive electrodes, so as to make a battery element. Thus obtained battery element was put into an aluminum-laminated film, an electrolytic solution was injected therein, and the film was sealed under vacuum, so as to yield a lithium-ion secondary battery. Employed as the electrolytic solution was one in which lithium hexafluorophosphate (LiPF$_6$) was dissolved at a concentration of 1.5 mol·dm$^{-3}$ in a mixed solvent made by mixing 20 parts by volume of propylene carbonate (PC), 10 parts by volume of ethylene carbonate (EC), and 70 parts by volume of diethyl carbonate.

Examples 2 to 4

Lithium-ion secondary batteries of Examples 2 to 4 were made as in Example 1 except that the amount of ion-exchanged water added in the mixed solvent was changed as listed in Table 1 in the preparation of the positive electrode active material layer forming coating material. The coating material state and viscosity change of each positive electrode active material layer forming coating material were also evaluated as in Example 1. Table 2 lists the results.

Example 5

The lithium-ion secondary battery of Example 5 was made as in Example 1 except that the amount of ion-exchanged water added in the mixed solvent was changed as listed in Table 1 and LiCoO$_2$ (product name: LIII, manufactured by Yuyan, China, having a pH of 10.2) was used as the positive electrode active material in the preparation of the positive electrode active material layer forming coating material. The coating material state and viscosity change of the positive electrode active material layer forming coating material were also evaluated as in Example 1. Table 2 lists the results.

Example 6

The lithium-ion secondary battery of Example 6 was made as in Example 1 except that the amount of ion-exchanged water added in the mixed solvent was changed as listed in Table 1 and LiCoNiMnO$_2$ (product name: 01ST, manufactured by Toda Kogyo Corp., having a pH of 10.7) was used as the positive electrode active material in the preparation of the positive electrode active material layer forming coating material. The coating material state and viscosity change of the positive electrode active material layer forming coating material were also evaluated as in Example 1. Table 2 lists the results.

Example 7

The lithium-ion secondary battery of Example 7 was made as in Example 1 except that N,N-dimethylformamide (DME) was used as the organic solvent, the amount of ion-exchanged water added in the mixed solvent was changed as listed in Table 1, and LiCoNiMnO$_2$ (product name: S-600, manufactured by Yuyan, China, having a pH of 10.9) was used as the positive electrode active material in the preparation of the positive electrode active material layer forming coating material. The coating material state and viscosity change of the positive electrode active material layer forming coating material were also evaluated as in Example 1. Table 2 lists the results.

Example 8

The lithium-ion secondary battery of Example 8 was made as in Example 1 except that the amount of ion-exchanged water added in the mixed solvent was changed as listed in Table 1 and LiCoNiMnO$_2$ (product name: S-600, manufactured by Yuyan, China, having a pH of 10.9) was used as the positive electrode active material in the preparation of the positive electrode active material layer forming coating material. The coating material state and viscosity change of the positive electrode active material layer forming coating material were also evaluated as in Example 1. Table 2 lists the results.

Example 9

The lithium-ion secondary battery of Example 9 was made as in Example 1 except that the amount of ion-exchanged water added in the mixed solvent was changed as listed in Table 1 and LiCoNiMnO$_2$ (product name: S-600, manufactured by Yuyan, China, having a pH of 10.9) was used as the positive electrode active material in the preparation of the positive electrode active material layer forming coating material. The coating material state and viscosity change of the positive electrode active material layer forming coating material were also evaluated as in Example 1. Table 2 lists the results.

Comparative Examples 1 to 3

Lithium-ion secondary batteries of Comparative Examples 1 to 3 were made as in Example 1 except that the amount of ion-exchanged water added in the mixed solvent was changed as listed in Table 1 (no ion-exchanged water was added in Comparative Example 1) in the preparation of the positive electrode active material layer forming coating material. The coating material state and viscosity change of each positive electrode active material layer forming coating material were also evaluated as in Example 1. Table 2 lists the results.

Comparative Example 4

The positive electrode active material layer forming coating material of Comparative Example 4 was made as in Example 1 except that the amount of ion-exchanged water added in the mixed solvent was changed as listed in Table 1 and polyvinylidene fluoride (PVDF) produced by suspension polymerization (product name: KF-1300 manufactured by Kureha Corp.) was used as the binder in the preparation of the positive electrode active material layer forming coating material. When evaluating the coating material state as in Example 1, gelling occurred immediately after the production. Therefore, no viscosity change could be evaluated, and no positive electrode could be made.

Comparative Example 5

The positive electrode active material layer forming coating material of Comparative Example 5 was made as in Example 1 except that the amount of ion-exchanged water added in the mixed solvent was changed as listed in Table 1 and LiCoNiMnO$_2$ (product name: 01ST, manufactured by Toda Kogyo Corp., having a pH of 10.7) was used as the positive electrode active material in the preparation of the positive electrode active material layer forming coating material. When evaluating the coating material state as in Example 1, gelling occurred immediately after the production. Therefore, no viscosity change could be evaluated, and no positive electrode could be made.

Comparative Example 6

The positive electrode active material layer forming coating material of Comparative Example 6 was made as in Example 1 except that the amount of ion-exchanged water added in the mixed solvent was changed as listed in Table 1, LiCoNiMnO$_2$ (product name: 01ST, manufactured by Toda Kogyo Corp., having a pH of 10.7) was used as the positive electrode active material, and polyvinylidene fluoride (PVDF) produced by suspension polymerization (product name: KF-1300 manufactured by Kureha Corp.) was used as the binder in the preparation of the positive electrode active material layer forming coating material. When evaluating the coating material state as in Example 1, gelling occurred immediately after the production. Therefore, no viscosity change could be evaluated, and no positive electrode could be made.

Comparative Example 7

The positive electrode active material layer forming coating material of Comparative Example 7 was made as in Example 1 except that the amount of ion-exchanged water added in the mixed solvent was changed as listed in Table 1 and LiNiCoAlO$_2$ (product name: 503LP, manufactured by JFE Mineral Co., Ltd., having a pH of 12.0) was used as the positive electrode active material in the preparation of the positive electrode active material layer forming coating material. When evaluating the coating material state as in Example 1, gelling occurred immediately after the production. Therefore, no viscosity change could be evaluated, and no positive electrode could be made.

Comparative Example 8

The positive electrode active material layer forming coating material of Comparative Example 8 was made as in Example 1 except that no ion-exchanged water was added in the mixed solvent, LiNiCoAlO$_2$ (product name: 503LP, manufactured by JFE Mineral Co., Ltd., having a pH of 12.0) was used as the positive electrode active material, and polyvinylidene fluoride (PVDF) produced by suspension polymerization (product name: KF-1300 manufactured by Kureha Corp.) was used as the binder in the preparation of the positive electrode active material layer forming coating material. When evaluating the coating material state as in Example 1, gelling occurred immediately after the production. Therefore, no viscosity change could be evaluated, and no positive electrode could be made.

Observation of Positive Electrode Cross Section

Figure 6:
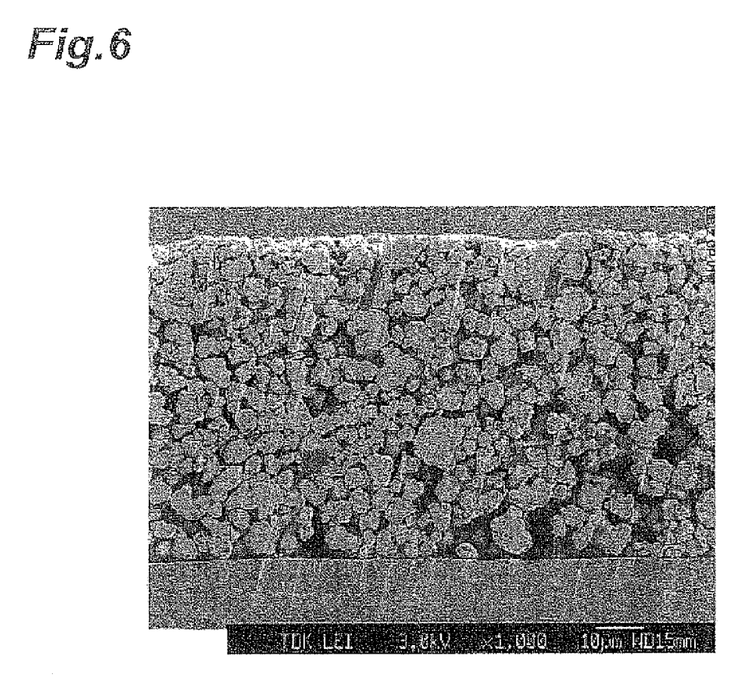
FIG. 6 is an electron micrograph of a cross section of the positive electrode produced by Example 1 (magnification: 1000×)
Figure 7:
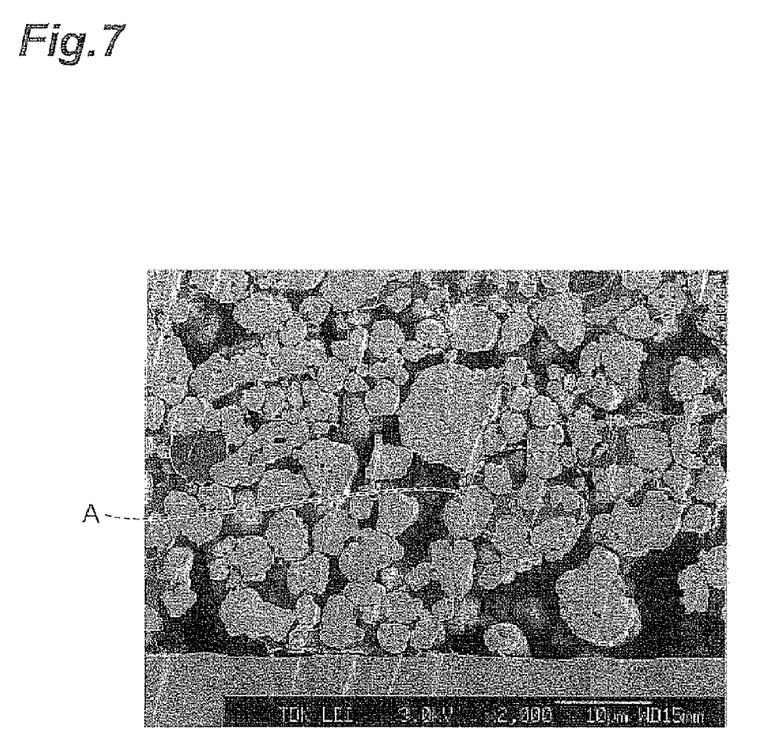
FIG. 7 is an electron micrograph of the cross section of the positive electrode produced by Example 1 (magnification: 2000×)
Figure 8:
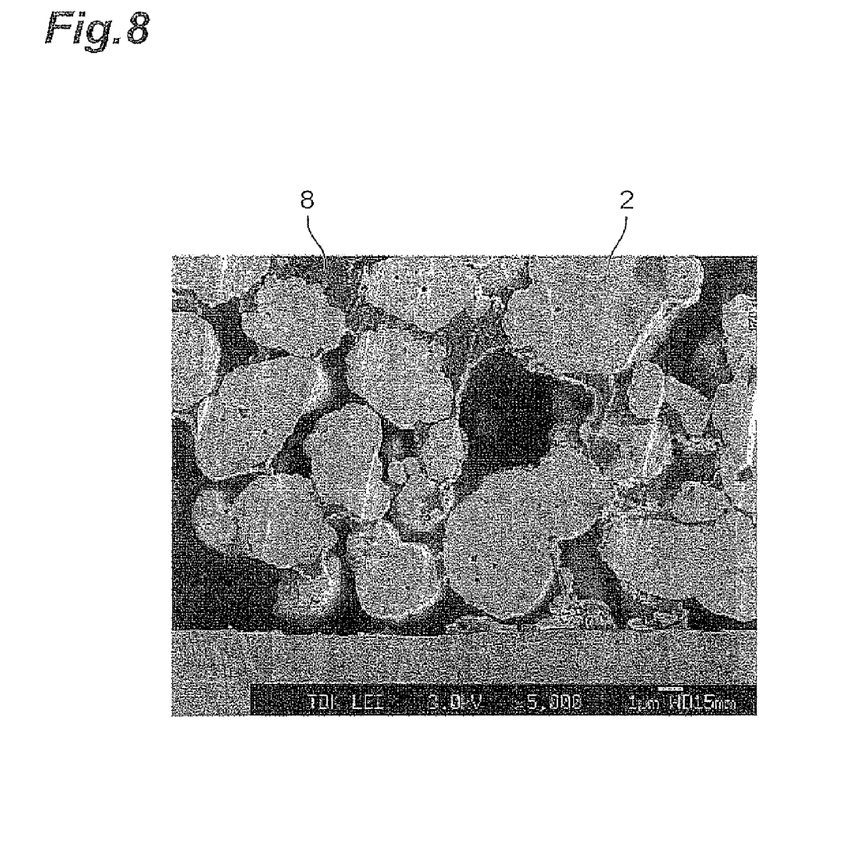
FIG. 8 is an electron micrograph of the cross section of the positive electrode produced by Example 1 (magnification: 5000×)
Figure 9:
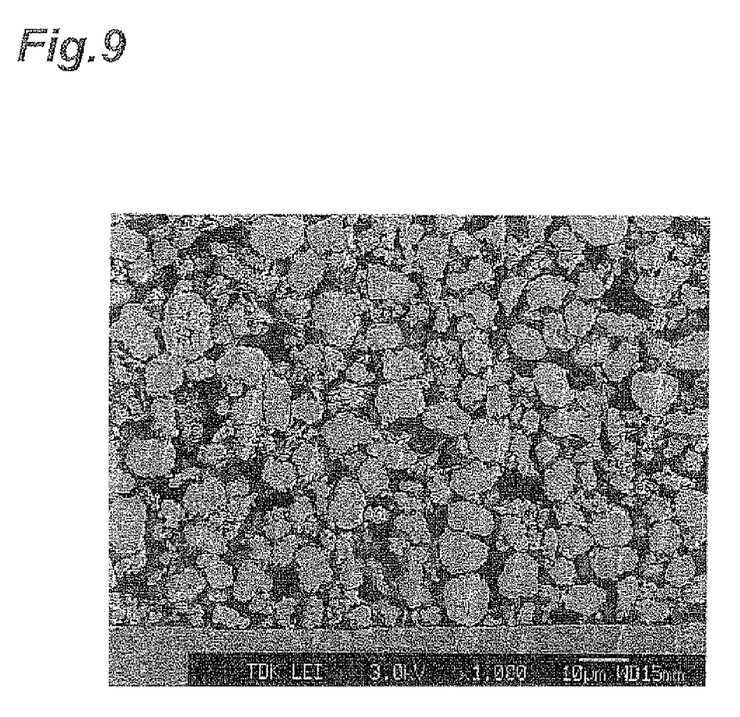
FIG. 9 is an electron micrograph of a cross section of the positive electrode produced by Comparative Example 1 (magnification: 1000×)
Figure 10:
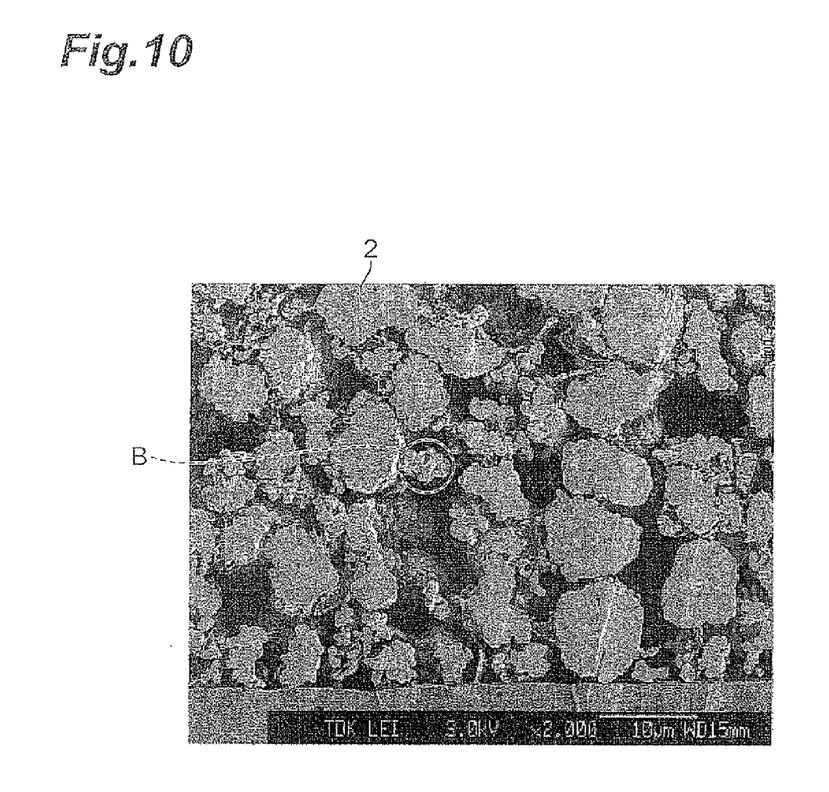
FIG. 10 is an electron micrograph of the cross section of the positive electrode produced by Comparative Example 1 (magnification: 2000×).

FIGS. 6, 7, and 8 illustrate electron micrographs of a cross section of the positive electrode produced by Example 1 (at magnifications of 1000×, 2000×, and 5000×, respectively). FIGS. 9 and 10 illustrate electron micrographs of a cross section of the positive electrode produced by Comparative Example 1 (at magnifications of 1000× and 2000×, respectively).

As illustrated in FIGS. 6 to 8, the positive electrode produced by Example 1 had a structure in which the surface of the positive electrode active material 2 was covered with the coating layer 8 formed by dispersing the conductive auxiliary in the binder without aggregation, while a plurality of pieces of the positive electrode active material 2 were connected to each other through the coating layer 8 (see, for example, the part indicated by broken line A in FIG. 7).

On the other hand, as illustrated in FIGS. 9 and 10, the positive electrode produced by Comparative Example 1 was not formed with the coating layer 8 in which the conductive auxiliary was dispersed in the binder, but the conductive auxiliary formed aggregates (see, for example, the part indicated by broken line B in FIG. 10).

Cross sections of the positive electrodes obtained by Examples 2 to 9 and Comparative Examples 2 and 3 were observed, so as to see whether the coating layer 8 exists or not. Table 2 lists the results.

Evaluation of Cycle Characteristic

Each of the lithium-ion secondary batteries obtained by Examples 1 to 9 and Comparative Examples 1 to 3 was electrically charged at a rate of 1 C at 25° C. by constant-current, constant-voltage charging at 4.2 V. Thereafter, constant-current discharging to 2.5 V was performed at a rate of 1 C at 25° C. Counting them as 1 cycle, 100 cycles were carried out. The ratio (%) of the discharge capacity at the 100th cycle to that of the 1st cycle was determined as a cycle characteristic. Table 2 lists the results.

TABLE 1

| | pH of positive electrode active material | Polymerization type of PVDF | Solvent | Amount of water added (% by mass) | [Amount of water added + (4.25 × pH)] value |
|---|---|---|---|---|---|
| Example 1 | 10.0 | emulsion polymerization | NMP | 8.50 | 51.0 |
| Example 2 | 10.0 | emulsion polymerization | NMP | 7.50 | 50.0 |
| Example 3 | 10.0 | emulsion polymerization | NMP | 9.50 | 52.0 |
| Example 4 | 10.0 | emulsion polymerization | NMP | 5.50 | 48.0 |
| Example 5 | 10.2 | emulsion polymerization | NMP | 7.65 | 51.0 |
| Example 6 | 10.7 | emulsion polymerization | NMP | 5.00 | 50.5 |
| Example 7 | 10.9 | emulsion polymerization | DMF | 4.50 | 50.8 |
| Example 8 | 10.9 | emulsion polymerization | NMP | 3.00 | 49.3 |
| Example 9 | 10.9 | emulsion polymerization | NMP | 4.50 | 50.8 |
| Comp. Ex. 1 | 10.0 | emulsion polymerization | NMP | 0 | 42.5 |
| Comp. Ex. 2 | 10.0 | emulsion polymerization | NMP | 5.00 | 47.5 |
| Comp. Ex. 3 | 10.0 | emulsion polymerization | NMP | 10.5 | 53.0 |

TABLE 1-continued

|  | pH of positive electrode active material | Polymerization type of PVDF | Solvent | Amount of water added (% by mass) | [Amount of water added + (4.25 × pH)] value |
|---|---|---|---|---|---|
| Comp. Ex. 4 | 10.0 | suspension polymerization | NMP | 5.00 | 47.5 |
| Comp. Ex. 5 | 10.7 | emulsion polymerization | NMP | 8.00 | 53.5 |
| Comp. Ex. 6 | 10.7 | suspension polymerization | NMP | 5.00 | 50.5 |
| Comp. Ex. 7 | 12.0 | emulsion polymerization | NMP | 1.50 | 52.5 |
| Comp. Ex. 8 | 12.0 | suspension polymerization | NMP | 0 | 51.0 |

TABLE 2

| | Coating material state (immediately after production) | Coating material viscosity change (MPa) | | | Coating layer | Cycle characteristic (%) |
|---|---|---|---|---|---|---|
| | | Initial | After 24 hr | After 48 hr | | |
| Example 1 | good | 3000 | 2950 | 2950 | yes | 97.6 |
| Example 2 | good | 2790 | 2750 | 2770 | yes | 97.8 |
| Example 3 | good | 3150 | 3120 | 3090 | yes | 95.4 |
| Example 4 | good | 3120 | 3070 | 3030 | yes | 95.8 |
| Example 5 | good | 2850 | 2900 | 2900 | yes | 96.6 |
| Example 6 | good | 3100 | 3050 | 3040 | yes | 95.3 |
| Example 7 | good | 3300 | 3100 | 2980 | yes | 93.2 |
| Example 8 | good | 3380 | 3290 | 3290 | yes | 92.6 |
| Example 9 | good | 3070 | 3000 | 2950 | yes | 96.7 |
| Comp. Ex. 1 | good | 3800 | 1800 | 1200 | no | 90.2 |
| Comp. Ex. 2 | good | 3800 | 2400 | 1700 | no | 91.7 |
| Comp. Ex. 3 | aggregated | 2400 | 1500 | 1270 | no | 74.5 |
| Comp. Ex. 4 | gelled | — | — | — | — | — |
| Comp. Ex. 5 | gelled | — | — | — | — | — |
| Comp. Ex. 6 | gelled | — | — | — | — | — |
| Comp. Ex. 7 | gelled | — | — | — | — | — |
| Comp. Ex. 8 | gelled | — | — | — | — | — |

As clear from the results listed in Table 2, it was seen that the positive electrode active material layer forming coating materials produced by the examples yielded favorable coating material states and little viscosity change, and were fully inhibited from deteriorating with time. On the other hand, the positive electrode active material layer forming coating materials produced by the comparative examples were seen to be aggregated or gelled or change their viscosity so much as to deteriorate with time. The positive electrode active material layers in the examples also exhibited bending strengths higher than those of the positive electrode active materials in the comparative examples.

Further, as clear from the results listed in Table 2, it was seen that the lithium-ion secondary batteries produced by the examples had cycle characteristics superior to those of the lithium-ion secondary batteries produced by the comparative examples.

What is claimed is:

1. A method of manufacturing a lithium-ion secondary battery positive electrode, the method comprising:
   a coating material preparing step of preparing a positive electrode active material layer forming coating material by mixing at least a positive electrode active material, a binder, a conductive auxiliary, an organic solvent, and water; and
   an active material layer forming step of forming a positive electrode active material layer on a current collector by using the positive electrode active material layer forming coating material;
   wherein the binder is polyvinylidene fluoride produced by emulsion polymerization; and
   wherein the positive electrode active material layer forming coating material is prepared in the coating material preparing step such that the amount of water added (% by mass) based on the total amount of the organic solvent and water and the pH of the positive electrode active material satisfy the following expression (1):

$$48 \leq [\text{the amount of water added} + (4.25 \times \text{the pH of the positive electrode active material})] \leq 52 \quad (1).$$

2. A method of manufacturing a lithium-ion secondary battery positive electrode according to claim 1, wherein the amount of water added in the coating material preparing step is 4 to 10% by mass based on the total amount of the organic solvent and water.

3. A method of manufacturing a lithium-ion secondary battery positive electrode according to claim 1, wherein the organic solvent is N-methyl-2-pyrrolidone.

4. A method of manufacturing a lithium-ion secondary battery having a step of making a positive electrode by the method of manufacturing a lithium-ion secondary battery positive electrode according to claim 1.

5. A lithium-ion secondary battery positive electrode made by the method of manufacturing a lithium-ion secondary battery positive electrode according to claim 1.

* * * * *